Feb. 13, 1951  C. M. EDDY ET AL  2,541,752
APPARATUS FOR INSPECTING SHEETS
Filed May 10, 1946
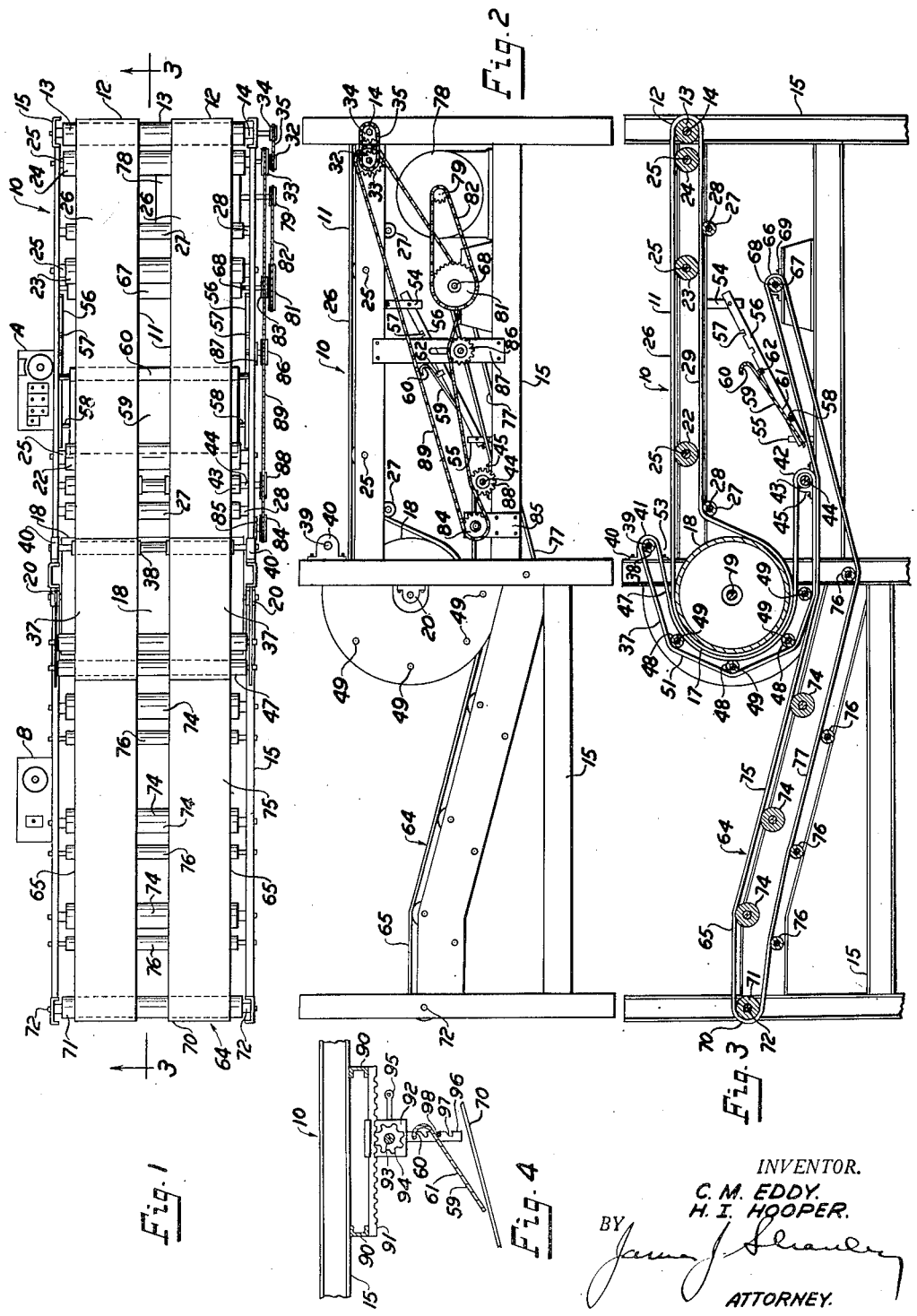
INVENTOR.
C. M. EDDY.
H. I. HOOPER.
BY
ATTORNEY.

Patented Feb. 13, 1951

2,541,752

UNITED STATES PATENT OFFICE 2,541,752

APPARATUS FOR INSPECTING SHEETS

Charles M. Eddy, Hollidays Cove, W. Va., and Harold I. Hooper, Hanlin Station, Pa., assignors to National Steel Corporation, a corporation of Delaware Application May 10, 1946, Serial No. 668,708

5 Claims. (Cl. 271—63)

The present invention relates to apparatus for inspecting sheets, and is primarily concerned with apparatus for successively moving sheets along a path and for turning the sheets during their movement along this path to permit inspection of both surfaces to determine the quality of the sheets.

The present invention will be described in connection with the inspection of sheets of tin plate, but is not limited to such sheets, and may be used for inspecting flexible sheets formed from any other suitable material.

Both electrolytic and hot dip sheets of tin plate are customarily inspected and sorted into grades, such as primes, seconds and wasters. Formerly, it was the practice to manually turn and inspect the sheets of tin plate and then place them in the proper group according to grades. This method of inspecting and sorting materially increased the cost of production. More recently various machines have been proposed and used for turning the sheets so as to permit inspection of both surfaces. In general, these machines have included a turning device that operates intermittently and this intermittent motion slows down the rate of sheet travel and greatly reduces the number of sheets which can be processed in a given period. Consequently, these prior art machines have not been able to attain the high rate of speed necessary to meet present day requirements.

Accordingly, it is an object of this invention to provide a continuously moving apparatus which will permit the rapid inspection of sheets of tin plate and the like.

It is also an object of this invention to provide a sheet inspection apparatus which will successively and rapidly move the sheets along a path and turn the sheets over to permit inspection of both surfaces.

A further object of this invention is to provide a tin plate inspection apparatus which is economical to build, install and maintain.

The present invention does provide a sheet conveying apparatus for successively turning sheets at a relatively high rate. Apparatus embodying a preferred form of the present invention includes a first conveyer which supports and moves the sheets along in a forward direction with a surface exposed upwardly for inspection; a guide for causing the sheets to travel through an arc at the end of the first conveyer to turn the sheets and discharge them in a rearward direction; an adjustable guide chute for receiving and properly aligning or positioning the discharged sheets; and a second conveyer for receiving the sheets from the chute and moving them in a forward direction while the opposite surface is exposed upwardly for inspection. All of these sheet moving elements move continuously and there is no sheet turning means that moves intermittently. Consequently, the present apparatus can be operated at a relatively high rate of speed and the sheet turning means does not act as a "bottleneck" tending to limit the rate of production of the inspection apparatus.

These and other objects and advantages will become more apparent from the following detailed description and the accompanying drawings, in which:

Figure 1 is a plan view of apparatus embodying the present invention;

Figure 2 is a side elevation of the apparatus of Figure 1;

Figure 3 is a longitudinal sectional view taken along line 3—3 of Figure 1; and, Figure 4 is a fragmentary, longitudinal sectional view taken in the same plane as Figure 3 and showing a modified form of the support for the sheet guiding chute.

Referring to the drawings, the apparatus comprises a first conveyer 10 for supporting and moving a series of sheets toward the left with their upper surfaces exposed upwardly for inspection. The conveyer 10 includes two, similar, relatively narrow belts 11 and at their entry ends 12 the belts extend about a pulley 13 mounted on a shaft 14 rotatably supported by the machine frame 15. The discharge ends 17 of belts 11 extend about a relatively large drum or pulley 18 mounted on a shaft 19 which is in turn rotatably mounted in bearings 20 supported by frame 15. Three rolls 22, 23 and 24 are each mounted on a separate shaft 25 rotatably supported by frame 15. These three rolls support the upper, feed side 26 of each belt 11 in a horizontal plane. Two relatively small pulleys 27 each mounted on a shaft 28 are provided for supporting the return side 29 of both belts 11. On an outer end of the shaft 25 of roll 24, there are a relatively small sprocket 32 and a relatively larger sprocket 33, both keyed to the shaft 25 so that the sprockets rotate together. A sprocket 34 is mounted on the outer end of shaft 14 and connected thereto by a key or other suitable means. A chain 35 connects sprockets 34 and 32. When the shaft 25 of roll 24 is rotated in a counterclockwise direction, the shaft 14 and pulley 13 rotate in a similar direction to move the upper feed side 26 of each belt 11 and the sheets supported thereon toward the left in a forward direction. At the discharge end 17, each belt moves through an arc about pulley 18 from the feed side 26 to the return side 29.

A pair of guide belts 37 at their entry end 41 extend about a pulley 38 mounted on a shaft 39 rotatably supported in bearings 40. Belts 37 at their discharge end 42 extend about a pulley 43 mounted on a shaft 44 rotatably supported in bearings 45. The feed side 47 of each belt 37 extends through an arc about the discharge end of conveyer 10 and is in sheet engaging relationship with the discharge end portion 17 of the corresponding belt 11. A plurality of spacer rolls 48, each mounted on a shaft 49 are provided for spacing apart the feed side, sides 47, and the return sides 51 of belts 37. The pulley 38 is preferably, although not necessarily, spaced sufficiently above conveyer 10 to provide an entering throat 53, as shown more clearly in Figure 3.

On each side of frame 15 there is a depending bracket 54 and an upwardly extending bracket 55. An inclined side bar 56 extends between each pair of brackets 54 and 55 and has a plurality of notches 57 along its upper edge. A rod 58 extends between the side bars 56, and the bars 56 and rod 58 adjustably support a sheet guide chute 59. The chute 59 includes an upwardly extending stop portion 60 and a downwardly inclined guide portion 61 which rests on rod 58. A cross-member 62 extends beneath the chute and engages notches 57 in side bars 56. The stop 60 extends in a direction substantially normal to the path of travel of the sheets and stops rearward movement of the sheets discharged in a rearward direction by guide belts 37 and properly aligns those sheets which become canted.

A second conveyer 64 supports and moves the turned sheets along a path in a forward direction with the opposite surface of each sheet exposed upwardly for inspection. The conveyer 64 includes two belts 65 which at their entry end 66 extend about a driven pulley 67 mounted on shaft 68 rotatably supported in bearings 69. At their discharge end 70, the belts 65 extend about a pulley 71 mounted on shaft 72. Three rolls 74 are provided for supporting the upper feed side 75 of belts 65 and four relatively small rolls 76 are provided for properly positioning the return side 77 of the belts. The conveyer 64 is positioned to receive sheets from chute 59 and is so positioned that the upper feed side 75 of each belt is in sheet engaging relationship with that portion of the return side 51 of the corresponding belt 37 which is adjacent the discharge end 42. With this construction, when the sheet slides down chute 59, the lower edge is engaged by the return side 51 of belts 37 and the feed side 75 of belts 65 so that the sheet is positively moved along toward the left by the belts.

A suitable drive means is provided for moving all of the belts 11, 37, and 65 at the same or substantially the same linear speed. A drive motor 78 is provided having a sprocket 79. A chain 82 engages sprocket 79 and a relatively large sprocket 81 on shaft 68. A second, small sprocket 83 is also mounted on shaft 68. An idler sprocket 84 is pivotally mounted in bracket 85 and a chain-tightening sprocket 86 is mounted on a plate 87 on frame 15. The sprocket 86 is preferably vertically adjustable for varying the tension of chain 89. There is a sprocket 88 mounted on the end of shaft 44. Chain 89 passes around sprockets 84 and 33, and passes under sprocket 83 and over sprockets 86 and 88. When motor 78 rotates in a counterclockwise direction, the pulleys 13, 43 and 67 are also rotated in the same direction. The pulleys and sprockets are so proportioned that all of the belts move at about the same speed.

Referring more particularly to Figure 4 which shows a modification of the supporting means for chute 59, two transversely extending beams 90 are fastened beneath frame 15 and support a pair of spaced racks 91 which extend in the direction of sheet travel. On each rack there is a slide 92 and the slides 92 carry a shaft 93 having a pair of pinions 94 mounted therein. On the outer end of shaft 93 is a crank arm 95. A depending bracket 96 is fastened to each slide 93 and includes a plurality of vertically spaced apart slots 97. A rod 98 is fastened to the bottom of chute 59 and is adapted to engage a pair of slots 97 to support the chute. The crank arm 95 can be manually turned to rotate the pinions 94 and move brackets 96 and chute 59 toward or away from the discharge end 42 of belts 37 for sheets of different length. The downwardly inclined portion 61 of chute 59 can be supported in any desired one of a plurality of inclined positions by fitting rod 98 into the desired pair of slots 97.

Before operation of the present apparatus, the chute 59 is, if necessary, adjusted either rearwardly or forwardly in accordance with the size of the sheets so that when a leading edge of a rearwardly moving sheet strikes the stop 60, the opposite, trailing edge of the sheet is free of belts 37 and can drop down past the discharge end 42 of belts 37 and the sheet then slides down into engagement with the feed side 75 of belts 65. The sheets to be inspected may be manually deposited one at a time on conveyer 10 or may be deposited on the conveyer by any suitable sheet-feeding mechanism. Any suitable sheet-sorting mechanism may be provided adjacent the discharge end 70 of conveyer 64 for receiving the sheets and sorting them according to grade. The sheet-sorting mechanism preferably includes a first control station A and a second control station B. The structure of the sheet sorting mechanism forms no part of the present invention.

After a sheet has been deposited on the conveyer belts 11 adjacent the entry end 12, it moves toward the left with one surface exposed upwardly for visual inspection by an operator adjacent control station A. As the sheet moves past him, this operator actuates the controls in accordance with the grade of the sheet to properly sort the sheet when it reaches the sorting mechanism. The sheet continues to move past the operator and then enters the throat 53 where it is gripped between belts 11 of the conveyer 10 and the guide belts 37 and moved through an arc which turns the sheet over and exposes the opposite face in the upward position. The sheet is discharged from between belts 11 and belts 37 with sufficient momentum for its leading edge to strike the upwardly extending stop portion 60 of guide chute 59. If, at the time of depositing the sheet or during its movement the sheet becomes canted so that its edges are not square with the direction of movement, then the impact of the sheet against the stop portion 60 will properly align the sheet. The trailing edge of the sheet then drops down so that the sheet can slide down the inclined portion 61 of chute 59 and the trailing edge of the sheet engages the feed side 75 of belts 65 and the sheet is moved toward the left by belts 37 and belts 65. As the sheet emerges from between the last mentioned belts, it is moved upwardly toward the left past the operator at station B who visually inspects the sheet and then actuates the control B so that the sorting mechanism will properly sort the sheet according to grade. The sheet continues to move toward the left to the discharge end 70 of the conveyer 64 where it is discharged to the sorting mechanism.

During the operation of the present inspection apparatus, the motor 78 and all of the belts are continuously operated and the speed at which sheets are sorted depends upon the ability of the operators at the stations A and B and upon the speed of the belts. There are no sheet-supporting arms or other intermittently operated sheet turning means to slow down the operation.

Having described our invention in detail, it is obvious that certain modifications may be made in the apparatus shown and described in detail without departing from the spirit and scope of the invention, except as set forth in the claims. For example, the pulley 43 may be at times advantageously positioned closer to the pulley 18, especially when sorting relatively short sheets. Further, a single belt may be substituted for each pair of relatively narrow belts.

We claim:

1. Apparatus for conveying and turning sheets comprising a conveyor belt for supporting and moving a sheet in forward direction from the entering end to the discharge end of the belt with a surface of the sheet exposed upwardly, said belt at the discharge end traveling through an arc from the feed side to the return side; a guide belt having a feed side traveling through an arc about the discharge end of the conveyor belt for receiving and guiding a sheet through an arc to change the direction of sheet travel, said guide belt being supported with the feed side at the discharge end traveling in a rearward direction for moving and discharging a sheet in a rearward direction with an opposite surface of the sheet exposed upwardly and being supported with the return side adjacent the discharge end traveling in an opposite forward direction; and a sheet-receiving conveyor belt with the feed side traveling in a forward direction for supporting and moving a sheet in a forward direction, said conveyor belt having the entering end supported to receive a sheet after being discharged rearwardly and having a portion of the feed side adjacent the entering end in sheet engaging relationship with a portion of the return side of said guide belt, for engaging and moving forwardly the received sheet.

2. Sheet conveying apparatus comprising a guide belt having a feed side for moving and guiding a sheet along a path to the discharge end of the belt, said guide belt being supported with the feed side at the discharge end arranged to travel in rearward direction for discharging a sheet in a rearward direction and said guide belt having a return side arranged to travel in an opposite forward direction adjacent the discharge end; a guide member positioned to receive the rearwardly discharged sheet from the guide belt and to guide the sheet downwardly onto a conveyor belt; and a sheet-receiving conveyor belt supported with the feed side arranged to travel in a forward direction from the entering end for supporting and moving a sheet in a forward direction, said conveyor belt having the entering end portion positioned to receive a sheet from the guide member and having a portion of the feed side adjacent the entering end in sheet engaging relationship with a portion of the return side of the guide belt for moving the received sheet in a forward direction.

3. Apparatus for conveying and turning sheets comprising a first conveyor belt for supporting and moving a sheet in a forward direction from the entering end to the discharge end of the belt with a surface of the sheet exposed upwardly, said belt at the discharge end traveling through an arc from the feed side to the return side; a guide belt having a feed side traveling through an arc at the discharge end of said first conveyor belt for receiving and guiding a sheet through an arc to change the direction of sheet travel, said guide belt being supported with the feed side at the discharge end traveling in a rearward direction for moving and discharging a sheet in a rearward direction with an opposite surface of the sheet exposed upwardly, and said guide belt being supported with the return side adjacent the discharge end traveling in an opposite forward direction; a guide member positioned to receive the rearwardly discharged sheet from the guide belt and positioned to guide the sheet downwardly onto a sheet-receiving conveyor belt; and a sheet-receiving conveyor belt with the feed side traveling in a forward direction from the entering end for supporting and moving a sheet in a forward direction, said sheet-receiving conveyor belt having the entering end extending rearwardly from the discharge end of said guide belt and having the entering end positioned to receive a sheet from said guide member and having a portion of the feed side adjacent said entering end in sheet engaging relationship with a portion of the forwardly moving return side of said guide belt.

4. Apparatus for conveying and turning sheets comprising a first conveyor belt for supporting and moving a sheet in a forward direction from the entering end to the discharge end of the belt with a surface of the sheet exposed upwardly; a guide belt having a feed side traveling through an arc at the discharge end of said first conveyor belt for receiving and guiding a sheet through an arc to change the direction of sheet travel, said guide belt being supported with the feed side at the discharge end traveling in a rearward direction for moving and discharging a sheet in a rearward direction with an opposite surface of the sheet exposed upwardly, and said guide belt being supported with the return side adjacent the discharge end traveling in an opposite forward direction; a guide member positioned to receive the rearwardly discharged sheet from the guide belt and positioned to guide the sheet downwardly onto a sheet-receiving conveyor belt; and a sheet-receiving conveyor belt with the feed side traveling in a forward direction from the entering end for supporting and moving a sheet in a forward direction, said conveyor belt having the entering end extending rearwardly from the discharge end of said guide belt and having the entering end positioned to receive a sheet from said guide member and having a portion of the feed side adjacent said entering end in sheet engaging relationship with a portion of the forwardly moving return side of said guide belt.

5. Apparatus for conveying and turning sheets comprising a first conveyor belt having a feed side and a return side, said conveyor belt being arranged for the feed side to move a sheet in a forward direction from the entering end toward the discharge end of the belt with the surface of the sheet exposed upwardly, said belt at the discharge end traveling through an arc from the feed side to the return side; a continuous guide belt having a feed side arranged to travel through an arc about the discharge end of said first conveyor belt for receiving and guiding a sheet through an arc to change the direction of sheet travel, said guide belt being supported with the feed side at the discharge end arranged to travel in a rearward direction to move and discharge a sheet in a rearward direction with an opposite surface of the sheet exposed upwardly and said guide belt being supported with the return side adjacent the discharge end arranged to travel in an opposite forward direction; a guide member supported in position to receive the sheet discharged by said guide belt, said guide belt including a stop portion extending normal to the path of the sheet for stopping rearward movement of the sheet, said guide member including a forwardly and downwardly inclined portion for guiding a stopped sheet forwardly and downwardly onto a sheet-receiving conveyor belt; means operable to move the guide member toward and away from the discharge end of the guide belt in accordance with the size of the sheet; and a sheet-receiving conveyor belt arranged with the feed side traveling in a forward direction for supporting and moving a sheet in a forward direction from the entering end to the discharge end, said entering end being positioned to receive a sheet from said guide member and being positioned rearwardly of the discharge end of said guide belt and said conveyor belt having a portion of the feed side adjacent said entering end in sheet engaging relationship with a portion of the forwardly moving return side of said guide belt.

CHARLES M. EDDY.
HAROLD I. HOOPER.

REFERENCES CITED

The following references are of record in the file of this patent:

UNITED STATES PATENTS

| Number | Name | Date |
|---|---|---|
| 1,272,847 | Pertz | July 16, 1918 |
| 1,337,031 | Allatt | Apr. 13, 1920 |
| 1,381,677 | Stenner | June 14, 1921 |
| 1,385,000 | Griffing | July 19, 1921 |
| 1,541,651 | Matlack | June 9, 1925 |
| 1,578,617 | Van Houten | Mar. 30, 1926 |
| 1,585,275 | Albrecht | May 18, 1926 |
| 1,862,676 | Gitzendanner | June 14, 1932 |
| 2,410,611 | Pratt et al. | Nov. 5, 1946 |